Oct. 23, 1951    H. W. GOFF    2,572,613
SETSCREW
Filed Nov. 27, 1945
FIG. 1
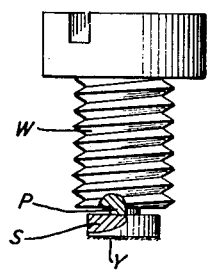
FIG. 2
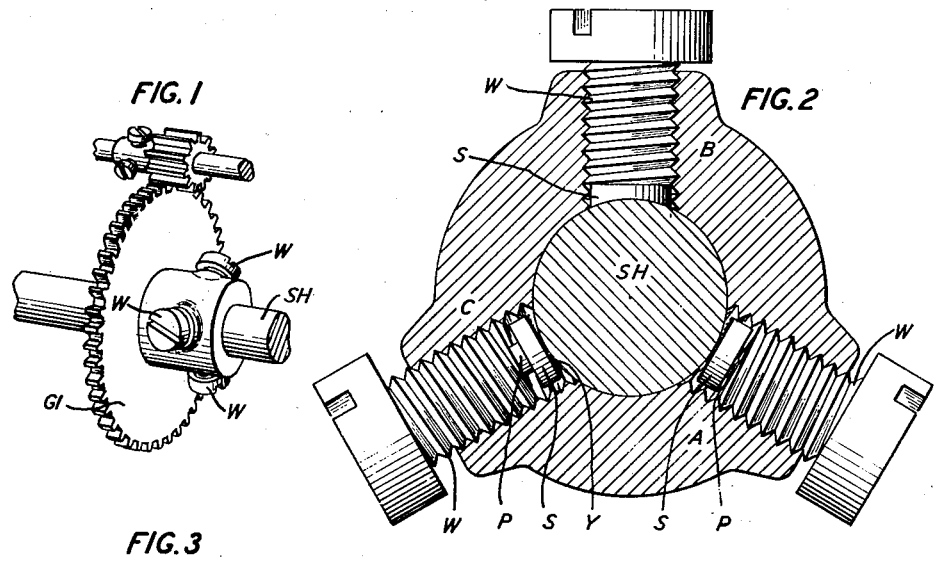
FIG. 3
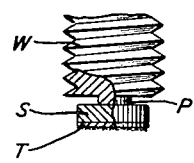
FIG. 4
FIG. 5
FIG. 6
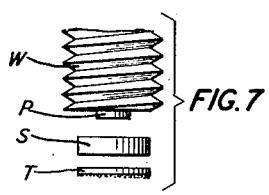
FIG. 7
INVENTOR
H. W. GOFF
BY J. MacDonald
ATTORNEY Patented Oct. 23, 1951

2,572,613

UNITED STATES PATENT OFFICE 2,572,613

SETSCREW

Harold W. Goff, Manhasset, N. Y., assignor to Bell Telephone Laboratories, Incorporated, New York, N. Y., a corporation of New York Application November 27, 1945, Serial No. 631,162

2 Claims. (Cl. 85—1)

This invention relates to set-screws of the type used for securing machine parts as gears, levers, and indicator elements for example, on their supporting shafts in angular relation to each other and to other gears, lever members, and indicator elements on another shaft or shafts to perform definite operations in relation to each other.

In set-screws of the type heretofore used the ends of the set-screws which engage the shaft are generally provided either with conical points or with circular cutting edges or ridges which sink into the shaft upon the tightening of such screws in order to secure the machine parts in adjusted angular relation to other parts on such shaft or other machine parts carried by other shafts.

In the use of such set-screws, however, it has been found in cases where it is necessary to impart a small adjusting angular movement to a machine part from a prior set position that the marks cut on the supporting shaft caused by the point or cutting edge at the end of the set-screw had the tendency of returning the machine part to its initially set position while tightening the screw, thus necessitating the resetting of all the machine parts on a shaft in position where the shaft had not been prviously damaged by the tightening of the set-screws.

The object of the present invention is the provision of a set-screw by which machine parts are secured on their supporting shafts relative to each other and relative to other parts on other shafts in a positive manner while avoiding the defects present in the set-screws of the type heretofore used.

In the drawing:

Fig. 1 is a perspective view of two intermeshing gears secured to their supporting shafts by set-screws constructed according to the present invention;

Fig. 2 is a partial end view of Fig. 1 enlarged with the hub in section to show a number of set-screws in different engaged relation in the securing operation of the large gear on its supporting shaft;

Fig. 3 is a partial view of the set-screw shown in Fig. 2 shown with portions in sections;

Fig. 4 is an exploded view of the set-screw shown in Fig. 3;

Fig. 5 is a modification of the set-screw shown in Fig. 2;

Fig. 6 is a modification of the set-screw shown in Fig. 3; and

Fig. 7 is an exploded view of Fig. 6.

According to the set-screw construction of this invention as shown in Figs. 2, 3 and 4, a disc or slug S which is made of brass or of other non-ferrous material is welded to a reduced portion P formed at the end of the set-screw W, while the surface Y of this slug which engages the periphery of the supporting shaft is coated with a mixture of fine powdered hard metal and abrasives such as emery formed under pressure and sintered to obtain cohesion of the powdered metal and abrasives. The diameter of the reduced portion P at the end of the set-screw is such as to cause this reduced portion to break following a minimum frictional engagement of the emery coated surface of the disc with the surface of the shaft as indicated at A in Fig. 2 as when tightening the set-screw, while the circular recess formed between the end portion of the screw W and the disc S serves for inserting a lubricant as graphite, for example, so as to decrease the friction between this end of the set-screw and the disc during the tightening of the set-screw sufficiently as to cold flow the disc S to the contour formed by the periphery of the shaft SH as shown at B in Fig. 2.

In a modification of the set-screw shown in Fig. 2 the disc or slug S as shown in Fig. 5 is formed integrally with the set-screw W as by removing the necessary number of threads from the threaded portion of the set-screw and forming the circular recess for receiving the lubricant SL, while to the surface Y of the slug which bears against the shaft SH is fitted a cup-shaped member M of non-metallic material partially filled with a fine abrasive which is thus retained in place by the cup instead of being coated to the surface of the slug which is disposed adjacent the shaft. In this construction the cup M is of a material which may be easily pierced by the abrasive material Y upon the tightening of the screw W so as to cause the disc S to cold flow as above described in connection with Fig. 2, the abrasive in each case serving to increase the friction between that surface of the disc and the shaft, such cup-shaped member being held securely on the periphery of the slug as by a so-called press fit engagement.

In a second modification of the set-screw of this invention, as shown in Figs. 6 and 7, a relatively thin disc of case-hardened steel T, for example, is secured as by adhesive or welded to the disc of non-ferrous material S with the surface of the disc which contacts with the surface of shaft roughened as by sand-blasting so as to provide a gripping surface.

In the securing operation of a machine part on its supporting shaft one or a plurality of set-screws constructed according to the present invention may be used depending upon the torque to be carried by the shaft supporting the machine part secured thereon. As shown in Figs. 1 and 2, three set-screws W are used for securing the gear G1 on its supporting shaft SH. A set-screw is shown at C, Fig. 2, engaged in its threaded hole in the hub of the gear G1 with the surface Y of slug S just touching the shaft SH. A set-screw is shown at A with its reduced portion P broken and partly cold flowed between the end of the set-screw W and the slug due to a partial tightening of set-screw while the set-screw W at B is shown to its full tightened position with the slug S cold flowed to take a shape corresponding to the contour or arc formed by the periphery of the supporting shaft SH.

According to the contour formation of the slug S as shown at B, Fig. 2, a resetting of the gear G1 on the shaft SH a small angular distance may be effected by the loosening of the set-screw without rotating the slug S and again tightened following such angular adjustment without the screw forcing the gear G1 back to its originally set position, since the surface of the shaft at its point of contact with the set-screw has not been damaged by the prior tightening of the set-screw.

What is claimed is:

1. A set-screw for securing the elements of a machine together in such a manner that no mutilating of the cooperating parts result and that fine adjustments of the elements may be readily effected, comprising an elongated externally threaded body member of relatively hard ferrous metal, having on one end thereof means for effecting the rotation thereof and on the other end a readily frangible reduced portion, the diameter of which is substantially less than the diameter of the body member, a disc of non-ferrous metal having a diameter less than the diameter of the body member but greater than the reduced end portion secured to said reduced end portion, and a hardened disc of ferrous metal, having a diameter substantially the same as and a thickness substantially less than the disc of non-ferrous metal, secured to said disc of non-ferrous metal and roughened on its outer surface.

2. A set-screw for securing the elements of a machine together in such a manner that no mutilating of the cooperating parts result and that fine adjustments of the elements may be readily effected, comprising an elongated externally threaded body member of relatively hard ferrous metal, a head on one end of said member for effecting the rotation thereof, said head having a diameter larger than that of said body member, the opposite end of said body member having a readily frangible protuberance integral therewith, the diameter of which is substantially less than the diameter of the body member, a disc of non-ferrous metal, having a diameter less than the diameter of the body member but greater than the protuberance secured to said protuberance and a relatively hard disc of ferrous metal having a diameter substantially the same as and a thickness substantially less than the disc of non-ferrous metal, secured to said disc of non-ferrous metal and having an abrasive on its outer surface.

HAROLD W. GOFF.

REFERENCES CITED

The following references are of record in the file of this patent:

UNITED STATES PATENTS

| Number | Name | Date |
|---|---|---|
| 262,997 | Tomlinson | Aug. 22, 1882 |
| 597,329 | Rylander | Jan. 11, 1898 |
| 628,060 | Zorn | July 4, 1899 |
| 851,447 | Simpson | Apr. 23, 1907 |
| 913,575 | Sprague | Feb. 23, 1909 |
| 1,107,177 | Noble | Aug. 11, 1914 |
| 1,469,043 | Laise | Sept. 25, 1923 |
| 1,581,096 | Barnes | Apr. 20, 1926 |
| 2,086,221 | Gwyn | July 6, 1937 |
| 2,386,897 | Johnson | Oct. 16, 1945 |

FOREIGN PATENTS

| Number | Country | Date |
|---|---|---|
| 74,318 | Austria | Apr. 10, 1918 |